(12) United States Patent
Mazanec et al.

(10) Patent No.: US 9,534,174 B2
(45) Date of Patent: Jan. 3, 2017

(54) FAST CATALYTIC PYROLYSIS WITH RECYCLE OF SIDE PRODUCTS

(71) Applicant: ANELLOTECH, INC., Pearl River, NY (US)

(72) Inventors: Terry Mazanec, Solon, OH (US); Jeff Whiting, Goshen, VT (US)

(73) Assignee: Anellotech, Inc., Pearl River, NY (US)

( * ) Notice: Subject to any disclaimer, the term of this patent is extended or adjusted under 35 U.S.C. 154(b) by 630 days.

(21) Appl. No.: 13/953,567

(22) Filed: Jul. 29, 2013

(65) Prior Publication Data

US 2014/0027265 A1  Jan. 30, 2014

Related U.S. Application Data

(60) Provisional application No. 61/676,843, filed on Jul. 27, 2012.

(51) Int. Cl.
| | | |
|---|---|---|
| *C10B 53/00* | (2006.01) | |
| *C10B 53/02* | (2006.01) | |
| *C10K 1/04* | (2006.01) | |
| *C10B 49/22* | (2006.01) | |
| *C10B 57/06* | (2006.01) | |
| *C10G 1/08* | (2006.01) | |
| *C10G 1/10* | (2006.01) | |
| *B01J 38/30* | (2006.01) | |

(Continued)

(52) U.S. Cl.
CPC ............... *C10B 53/02* (2013.01); *C10B 49/22* (2013.01); *C10B 57/06* (2013.01); *C10G 1/086* (2013.01); *C10G 1/10* (2013.01); *C10K 1/04* (2013.01); *B01D 2311/04* (2013.01); *B01J 29/40* (2013.01); *B01J 29/90* (2013.01); *B01J 38/30* (2013.01); *C10G 2300/1014* (2013.01); *C10G 2300/1018* (2013.01); *C10G 2400/30* (2013.01); *Y02E 50/14* (2013.01); *Y02P 20/584* (2015.11); *Y02P 30/20* (2015.11)

(58) Field of Classification Search
CPC ............. C10G 1/02; C10G 1/08; C10G 1/086; C10G 1/10; C10B 49/22; C10B 53/02; C10B 57/06; C10K 1/04
USPC ..................... 201/2.5, 29; 585/240, 241, 242
See application file for complete search history.

(56) References Cited

U.S. PATENT DOCUMENTS

| | | |
|---|---|---|
| 2,400,802 A | 5/1946 | Arnold |
| 2,442,060 A | 5/1948 | Shepardson |

(Continued)

FOREIGN PATENT DOCUMENTS

| | | |
|---|---|---|
| EP | 0118310 A2 | 9/1984 |
| WO | 2012012684 A1 | 1/2012 |
| WO | 2014079572 A1 | 5/2014 |

OTHER PUBLICATIONS

Huber, George et al., "Synthesis of Transportation Fuels from Biomass: Chemistry, Catalysts, and Engineering," Chem. Rev. 106, (2006), pp. 4044-4098.

(Continued)

*Primary Examiner* — Jill Warden
*Assistant Examiner* — Joye L Woodard
(74) *Attorney, Agent, or Firm* — Frank Rosenberg (57) ABSTRACT

This invention relates to improvements in the fast pyrolysis of biomass. In this invention, a portion of the products from a pyrolysis reactor are condensed in the liquid phase and at least a portion of the recovered liquid is recycled to the pyrolysis reactor for further conversion to valuable, useful products.

17 Claims, 1 Drawing Sheet

(51) Int. Cl.
  *B01J 29/40* (2006.01)
  *B01J 29/90* (2006.01)

(56) References Cited

U.S. PATENT DOCUMENTS

| | | | |
|---|---|---|---|
| 3,221,077 A | | 11/1965 | Dulaney |
| 3,298,928 A | | 1/1967 | Esterer |
| 3,789,077 A | | 1/1974 | Kosseim et al. |
| 3,816,302 A | | 6/1974 | Paret |
| 3,923,921 A | | 12/1975 | Kohfeldt |
| 3,996,129 A | | 12/1976 | Weith et al. |
| 4,086,159 A | | 4/1978 | Baxter et al. |
| 4,101,597 A | | 7/1978 | Breckenridge |
| 4,528,412 A | | 7/1985 | Steacy et al. |
| 4,599,478 A | | 7/1986 | Kamisaka et al. |
| 4,960,440 A | * | 10/1990 | Betz .................. C10B 53/07 201/29 |
| 5,225,072 A | | 7/1993 | Vidueira |
| 5,279,646 A | | 1/1994 | Schwab |
| 6,004,452 A | | 12/1999 | Ash et al. |
| 6,576,132 B2 | | 6/2003 | Kurukchi et al. |
| 7,165,615 B2 | | 1/2007 | Vinegar et al. |
| 7,820,033 B2 | | 10/2010 | Eng et al. |
| 8,003,835 B2 | | 8/2011 | Yanik et al. |
| 8,080,698 B2 | | 12/2011 | Eng et al. |
| 8,236,173 B2 | * | 8/2012 | Bartek .................. C10B 53/02 208/400 |
| 8,277,643 B2 | | 10/2012 | Huber et al. |
| 8,748,680 B2 | | 6/2014 | Hogendoom et al. |
| 8,936,654 B2 | | 1/2015 | Platon et al. |
| 2006/0096163 A1 | | 5/2006 | Dickinson et al. |
| 2009/0227823 A1 | | 9/2009 | Huber et al. |
| 2011/0139596 A1 | * | 6/2011 | Bartek .................. C10B 53/02 201/2.5 |
| 2011/0232163 A1 | | 9/2011 | Siskin |
| 2011/0283601 A1 | | 11/2011 | Ditsch |
| 2012/0017493 A1 | | 1/2012 | Traynor et al. |
| 2012/0152801 A1 | | 6/2012 | Bozzano et al. |
| 2012/0165584 A1 | | 6/2012 | Eng |
| 2012/0167452 A1 | | 7/2012 | Platon et al. |
| 2013/0060070 A1 | | 3/2013 | Huber et al. |
| 2013/0205651 A1 | | 8/2013 | Wang et al. |
| 2013/0245351 A1 | | 9/2013 | Al Haji |
| 2013/0306557 A1 | | 11/2013 | Moore et al. |
| 2015/0299086 A1 | | 10/2015 | Farha et al. |

OTHER PUBLICATIONS

Rezaei, Pouya Sirous et al., "Production of green aromatics and olefins by catalytic cracking of oxygenate compounds derived from biomass pyrolysis: A review," Applied Catalysis A: General 469(2014) 490-511.

Torren, R. Carlson et al., "Production of green aromatics and olefins by catalytic fast pyrolysis process of wood sawdust," Energy & Environmental Science, vol. 4, No. 1,Jan. 1, 2011 (Jan. 1, 2011), p. 145.

Bridgwater, A., Czernik, S. and Piskorz, J., "An Overview of Fast Pyrolysis," in Progress in Thermochemical Biomass Conversion (ed A. V. Bridgwater), (2001) , pp. 977-997, Blackwell Science Ltd, Oxford, UK.

Demirbas, A.,"Conversion of Biomass to a Pyrolytic Oil for Blending Gasoline as an Alternative Fuel in Internal Combustion Engines," Enegy Sources, 2001, pp. 553-562, vol. 23.

Lappas, A. A., M.C. Samolada, D.K. Iatridis, S.S. Voutetakis, I.A. Vasalos, "Biomass pyrolysis in a circulating fluid bed reactor for the production of fuels and chemicals", Fuel 81 (2002) pp. 2087-2095.

* cited by examiner

FAST CATALYTIC PYROLYSIS WITH RECYCLE OF SIDE PRODUCTS

RELATED APPLICATION

This application claims the benefit of priority U.S. provisional patent application Ser. No. 61/676,843, filed Jul. 27, 2012.

INTRODUCTION

Due to its cost and wide availability, lignocellulosic biomass is under worldwide-study as a viable feedstock for renewable liquid biofuels and chemicals because of its low cost and wide availability. Biomass-derived fuels and chemicals substantially reduce net CO2 emissions if produced with minimal use of fossil fuels. However, lignocellulosic biomass is not currently commonly used as a liquid fuel or chemicals source because typical current conversion processes are not considered to be economically viable. Several routes are being examined to convert solid biomass to valuable liquid fuels and chemicals. At low temperatures (e.g., 200-260° C.) diesel range alkanes can be produced by a multi-step, aqueous-phase processing (APP) of aqueous carbohydrate solutions involving dehydration, aldol-condensation and dehydration/hydrogenation. However, APP requires that solid lignocellulosic biomass first be converted into aqueous carbohydrates.

At higher temperatures (about 800° C.), solid biomass can be reformed to produce synthesis gas through partial oxidation over catalysts in an auto thermal, packed-bed reactor. The synthesis gas produced from this reaction can be fed to a secondary process such as Fischer-Tropsch or methanol synthesis to make fuels and chemicals. An ideal process for solid biomass conversion would involve the production of a liquid fuel that can be easily handled within existing infrastructure from solid biomass in a single step, at short residence times.

Unfortunately, neither the APP nor the syngas process meets such criteria. Another approach for biofuel production is fast pyrolysis, which can involve, for example, rapidly heating biomass (e.g., about 500° C./second) to intermediate temperatures (e.g., 400-600° C.) followed by rapid cooling (e.g., residence times of 1-2 seconds). (See, A. V. Bridgwater, Fast Pyrolysis of Biomass: A Handbook Volume 2, CPL Press, Newbury, UK, 2002.) Conventional fast pyrolysis often produces a thermally unstable, liquid product mixture, called bio-oil, an acidic, combustible liquid mixture of more than 300 compounds that degrades over time.

However, bio-oils are not compatible with existing liquid transportation fuels, such as gasoline and diesel, and their yields are low. Bio-oils require considerable further transformation to produce useful chemical intermediates as well. Accordingly, there remains an on-going search in the art for an economical, efficient route for the production of useful biofuels and related compounds from solid biomass.

Since bio-oils recovered from pyrolysis are often difficult to work with, there has been extensive research conducted on treatments of the bio-oils to make them more useful. One such example is work by Sisken et al. in US 2011/0232163 describing a noncatalytic fast pyrolysis of biomass to produce a bio oil. The bio oil is complex and does not dissolve in water or hydrocarbon liquids. The bio oil is reacted with steam and carbon monoxide at elevated temperature and pressure. In this reaction, "Organic compounds, including any remaining lignocellulosic material, dissolve in water and, once dissolved, the water will efficiently break cellulose and other bonds and then undergo hydrogenation reactions with hydrogen from the water released by the mediation of the carbon monoxide." The reaction is preferably conducted in supercritical water. The mechanisms of the reaction are discussed in paragraph [0026]: "Condensation type polymers, polymers containing, e.g., ester, ether, and amide linkages are likely to be cleaved to their starting materials at 300° C. and above and esters, ethers, sulfides, amines and even diaryl ethers cleave rapidly, carboxylic acids are decarboxylated ($-CO_2$) and aldehydes are decarbonylated (—CO). Such reactions effect cleavage of cross-links containing oxygen, nitrogen and sulfur moieties with the concurrent loss of much of these heteroatoms." A solvent such as alcohol, ketone, phenol, and carboxylic acid can be used to enhance flowability of the oil and reaction products. If acids are used as solvents, they may also function as catalysts. Sisken et al. suggest that a recycle step "may aid in dissolution of the oil into the aqueous phase as a result of the alcohols, phenols, and carboxylic acids contained in the recycle solution; the acidic components in the aqueous recycle solution may also act as catalysts for the reactions in addition to the activity of the high temperature water." The process of Sisken et al. may be conducted where the total system pressure at reaction condition is suitably in the range of about 12 to 30 MPa.

There remains a need to improve uses for the liquid phase products of pyrolysis, especially the liquid phase products recovered from fast catalytic pyrolysis (FCP) especially those which do not require high pressures.

SUMMARY OF THE INVENTION

In a first aspect, the invention provides a method for producing one or more fluid hydrocarbon products from a hydrocarbonaceous material comprising feeding a hydrocarbonaceous material to a reactor, and pyrolyzing within the reactor, in the presence of a solid catalyst (such as a zeolite), at least a portion of the hydrocarbonaceous material under reaction conditions sufficient to produce one or more pyrolysis products, condensing a liquid phase product, and feeding a portion of the condensed products to the reactor.

In some preferred embodiments, the catalyzed pyrolysis forms olefins and aromatics. In some embodiments, the liquid phase product comprises an aqueous phase and an organic phase, and a portion of the aqueous phase is fed back into the FCP reactor. In some embodiments, at least a portion of the water has been removed from the aqueous phase before it is returned to the reactor.

The hydrocarbonaceous material that is fed to the reactor typically comprises a solid hydrocarbonaceous material, often in the presence of a gas phase. In some preferred embodiments, the hydrocarbonaceous material is at least 90 mass % solids. In some lesser preferred embodiments the hydrocarbonaceous material could be only in the gas and/or a liquid or slurry phase. The recycle stream, preferably an aqueous recycle stream, can be contacted with the hydrocarbonaceous material before the hydrocarbonaceous material is fed to the reactor.

The solid catalyst in the FCP reactor may comprise elements such as, for example, silicon, aluminum, titanium, vanadium, chromium, manganese, iron, cobalt, nickel, copper, zinc, gallium, platinum, palladium, silver, phosphorus, sodium, potassium, magnesium, calcium, tungsten, zirconium, cerium, lanthanum, and combinations thereof. Additional catalyst materials or inert solids may also be present. In some preferred embodiments, the FCP reaction is catalyzed by a zeolite. In some preferred embodiments, the mass ratio of catalyst fed to the reactor to hydrocarbonaceous material fed to the reactor is between 0.1 and 20.

In preferred embodiments, an aqueous phase is recovered from the FCP reactor and carbonaceous material is removed from the aqueous phase and at least a portion of the separated carbonaceous materials is recycled to the FCP reactor. Preferably, the separated carbonaceous phase comprises olefins, aromatics, or oxygenates, or a mixture of these, and at least a portion of these are fed to the FCP reactor. This can be done, for example, by a stripping process in which a liquid phase is contacted with a gas (such as by bubbling a gas through the liquid) and the resulting gas phase, which is enriched with at least one component from the liquid phase, is passed into the reactor. Alternatively, the liquid phase can be stripped and then the liquid phase, now at least partly depleted of at least one component, is recycled to the reactor. As with any of the recycle steps, the return flow may be directly into the reactor or at any stage in a flow path prior to the reactor stage.

In preferred embodiments, the FCP reactor is a fluidized bed, circulating bed or riser reactor. In some preferred embodiments, the temperature within the reactor is between 300 and 1000° C.

The hydrocarbonaceous material fed to the reactor may comprise a biomass material; or plastic waste, recycled plastics, agricultural and municipal solid waste, food waste, animal waste, carbohydrates, or lignocellulosic materials; or the hydrocarbonaceous material can comprise xylitol, glucose, cellobiose, hemi-cellulose, or lignin; or the hydrocarbonaceous material may comprise sugar cane bagasse, glucose, wood, or corn stover, or any of these materials in any combination.

In many aspects, the invention concerns the recycle of liquid phase produced in an FCP reactor; however, the invention also includes recycle to any pyrolysis reactor (including reactors without a solid catalyst) where the liquid phase is treated by any of the methods described herein. In any of the inventive aspects, the pyrolysis step(s), recycle step(s) (an preferably all process steps) may preferably be conducted at a pressure (absolute) of 30 atm or less, more preferably of less than 10 atm, in some embodiments less than 1 atm; and in some embodiments in the range of 0.1 to 10 atm.

In some embodiments, the feed composition (e.g., in feed stream 6 of FIG. 1) comprises a mixture of hydrocarbonaceous material and a catalyst. The mixture may comprise, for example, solids, liquids, and/or gases. In certain embodiments, the mixture comprises a composition of a solid catalyst and a solid hydrocarbonaceous material. In other embodiments, a catalyst may be provided separately from the reactor feed stream. In some embodiments the feed may be kept in an inert atmosphere or an atmosphere formed by the vent gases from the process, 74.

Figure 1:
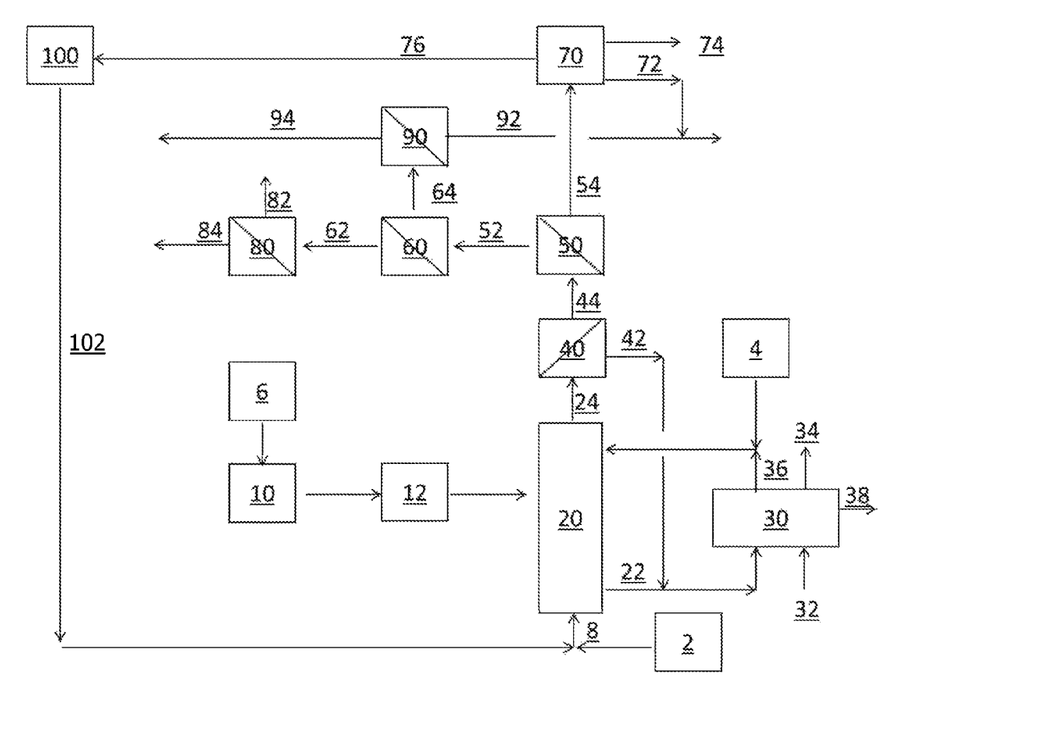
FIG. 1 schematically illustrates a system for pyrolysis of biomass with a liquid recycle step.

In some embodiments, for example when solid hydrocarbonaceous materials are used, moisture may optionally be removed from the feed composition prior to being fed to the reactor, e.g., by an optional dryer 10. Removal of moisture from the feed stream may be advantageous for several reasons. For example, the moisture in the feed stream may require additional energy input in order to heat the feed to a temperature sufficiently high to achieve pyrolysis. Variations in the moisture content of the feed may lead to difficulties in controlling the temperature of the reactor. In addition, removal of moisture from the feed can reduce or eliminate the need to process the water during later processing steps.

In some embodiments, the feed composition may be dried until the feed composition comprises less than about 10%, less than about 5%, less than about 2%, or less than about 1% water by weight. Suitable equipment capable of removing water from the feed composition is known to those skilled in the art. As an example, in one set of embodiments, the dryer comprises an oven heated to a particular temperature (e.g., at least about 80° C., at least about 100° C., at least about 150° C., or higher) through which the feed composition is continuously, semi-continuously, or periodically passed. In some cases, the dryer may comprise a vacuum chamber into which the feed composition is processed as a batch. Other embodiments of the dryer may combine elevated temperatures with vacuum operation. The dryer may be integrally connected to the reactor or may be provided as a separate unit from the reactor.

In some instances, the particle size of the feed composition may be reduced in an optional grinding system 12 prior to passing the feed to the reactor. In some embodiments, the average diameter of the ground feed composition exiting the grinding system may comprise no more than about 50%, not more than about 25%, no more than about 10%, no more than about 5%, no more than about 2% of the average diameter of the feed composition fed to the grinding system. Large-particle feed material may be more easily transportable and less difficult to process than small-particle feed material. On the other hand, in some cases it may be advantageous to feed small particles to the reactor (as discussed below). The use of a grinding system allows for the transport of large-particle feed between the source and the process, while enabling the feed of small particles to the reactor.

Suitable equipment capable of grinding the feed composition is known to those skilled in the art. For example, the grinding system may comprise an industrial mill (e.g., hammer mill, ball mill, etc.), a unit with blades (e.g., chipper, shredder, etc.), or any other suitable type of grinding system. In some embodiments, the grinding system may comprise a cooling system (e.g., an active cooling systems such as a pumped fluid heat exchanger, a passive cooling system such as one including fins, etc.), which may be used to maintain the feed composition at relatively low temperatures (e.g., ambient temperature) prior to introducing the feed composition to the reactor. The grinding system may be integrally connected to the reactor or may be provided as a separate unit from the reactor. While the grinding step is shown following the drying step in FIG. 1, the order of these operations may be reversed in some embodiments. In still other embodiments, the drying and grinding steps may be achieved using an integrated unit.

In some cases, grinding and cooling of the hydrocarbonaceous material may be achieved using separate units. Cooling of the hydrocarbonaceous material may be desirable, for example, to reduce or prevent unwanted decomposition of the feed material prior to passing it to the reactor. In one set of embodiments, the hydrocarbonaceous material may be passed to a grinding system to produce a ground hydrocarbonaceous material. The ground hydrocarbonaceous material may then be passed from the grinding system to a cooling system and cooled. The hydrocarbonaceous material may be cooled to a temperature of lower than about 300° C., lower than about 200° C., lower than about 100° C., lower than about 75° C., lower than about 50° C., lower than about 35° C., or lower than about 20° C. prior to introducing the hydrocarbonaceous material into the reactor. In embodiments that include the use of a cooling system, the cooling system includes an active cooling unit (e.g., a heat exchanger) capable of lowering the temperature of the biomass. In some embodiments, two or more of the drier, grinding system, and cooling system unit operations may be combined into a single unit. The cooling system may be, in some embodiments, directly integrated with one or more reactors.

As illustrated in FIG. 1, the feed composition may be transferred to reactor 20. The feed may be kept under an inert atmosphere such as the vent gas 74 or other suitable gas. Fluids such as recycle gas 102, vent gas 74 or other fluids may be fed along with the solid hydrocarbonaceous feed into reactor 20 in order to facilitate smooth feed flow. Optionally a portion of the aqueous phase 84 or organic phase 94 may be fed along with the hydrocarbonaceous feed. Aqueous phase 84 or organic phase 94 may optionally be combined to be fed to reactor 20 or may be fed separately.

The reactor may be used, in some instances, to perform catalytic pyrolysis of hydrocarbonaceous material. In the illustrative embodiment of FIG. 1, the reactor comprises any suitable reactor known to those skilled in the art. For example, in some instances, the reactor may comprise a continuously stirred tank reactor (CSTR), a batch reactor, a semi-batch reactor, or a fixed bed catalytic reactor, among others. In some cases, the reactor comprises a fluidized bed reactor, e.g., a circulating fluidized bed reactor, a moving bed reactor such as a riser reactor, or a bubbling bed reactor. Fluidized bed reactors may, in some cases, provide improved mixing of the catalyst and/or hydrocarbonaceous material during pyrolysis and/or subsequent reactions, which may lead to enhanced control over the reaction products formed. The use of fluidized bed reactors may also lead to improved heat transfer within the reactor. In addition, improved mixing in a fluidized bed reactor may lead to a reduction of the amount of coke adhered to the catalyst, resulting in reduced deactivation of the catalyst in some cases. Throughout this specification, various compositions are referred to as process streams; however, it should be understood that the processes could also be conducted in batch mode.

In the set of embodiments illustrated in FIG. 1, separated catalyst may exit the solids separator via stream 42. In some cases, the catalyst exiting the separator may be at least partially deactivated. The separated catalyst 42 may be fed, in some embodiments, to a regenerator 30 in which any catalyst that was at least partially deactivated may be re-activated. Used catalyst also exits reactor 20 via stream 22 so that a flow of catalyst through the reactor is established. The separated catalyst 42 may be combined with used catalyst stream 22 before feeding to regenerator 30. In some embodiments, the regenerator may comprise optional purge stream 38, which may be used to purge coke, ash, and/or catalyst from the regenerator. Methods for activating and regenerating catalyst are well-known to those skilled in the art, for example, as described in *Kirk-Othmer Encyclopedia of Chemical Technology* (Online), Vol. 5, Hoboken, N.J.: Wiley-Interscience, 2001, pages 255-322.

In one set of embodiments, an oxidizing agent is fed to the regenerator via a stream 32, e.g., as shown in FIG. 1. The oxidizing agent may originate from any source including, for example, a tank of oxygen, atmospheric air, or steam, among others. In the regenerator, the catalyst is re-activated by reacting the catalyst with the oxidizing agent. In some cases, the deactivated catalyst may comprise residual carbon and/or coke, which may be removed via reaction with the oxidizing agent in the regenerator. The regenerator in FIG. 1 comprises a vent stream 34 which may include regeneration reaction products, residual oxidizing agent, etc. The vent stream from the regenerator may be passed through a catalytic exhaust gas cleanup system to further reduce the concentrations of CO and hydrocarbons to reduce emissions vented to the atmosphere. Portions of the vent stream 34 may be recycled to the gas feed 32 of the regenerator 30 to control the heat release of the regeneration process.

The regenerator may be of any suitable size mentioned above in connection with the reactor or the solids separator. In addition, the regenerator may be operated at elevated temperatures in some cases (e.g., at least about 300° C., 400° C., 500° C., 600° C., 700° C., 800° C., or higher). The residence time of the catalyst in the regenerator may also be controlled using methods known by those skilled in the art, including those outlined above. In some instances, the mass flow rate of the catalyst through the regenerator will be coupled to the flow rate(s) in the reactor and/or solids separator in order to preserve the mass balance in the system.

As shown in the illustrative embodiment of FIG. 1, the regenerated catalyst may exit the regenerator via stream 36. The regenerated catalyst may be recycled back to the reactor. In some cases, catalyst may be lost from the system during operation or catalyst may be removed as it deactivates. In some such and other cases, additional "makeup" catalyst may be added to the system from fresh catalyst inventory 4. As shown illustratively in FIG. 1, the regenerated and makeup catalyst may be fed to the reactor via a separate stream, or the regenerated and makeup catalyst may be fed with the fluidization fluid via recycle stream 8, or any selected combination of these.

Referring back to solids separator 40 in FIG. 1, the reaction products (e.g., fluid hydrocarbon products) exit the solids separator via stream 44. In some cases, a fraction of stream 44 may be purged. The contents of the purge stream may be fed to a combustor or a water-gas shift reactor, for example, to recuperate energy that would otherwise be lost from the system. Preferably, the reaction products in stream 44 may be fed to condenser 50. The condenser may comprise a heat exchanger which condenses at least a portion of the reaction products from a gaseous to a liquid state. The condenser may be used to separate the reaction products into gaseous, liquid, and solid fractions. The condenser may be a series of condensers operated at different temperatures and flow rates rather than a single unit. The operation of condensers is well known to those skilled in the art. Examples of condensers are described in more detail in *Perry's Chemical Engineers' Handbook*, Section 11: "Heat Transfer Equipment." 8th ed. New York: McGraw-Hill, 2008.

The condenser may also, in some embodiments, make use of pressure change to condense portions of the product stream. In FIG. 1, stream 52 may comprise the liquid fraction of the reaction products (e.g., water, aromatic compounds, olefin compounds, etc.), and stream 54 may comprise the gaseous fraction of the reaction products (e.g., CO, $CO_2$, $H_2$, ethylene, propylene, butenes, etc.). In some embodiments, the gaseous fraction may be fed to a vapor recovery system 70. The vapor recovery system may be used, for example, to recover any selected vapors within stream 54 and transport them via stream 72. Stream 72 may be combined with product stream 92 for further purification or as feed to further upgrading. In addition, stream 74 may be used to transport CO, $CO_2$, and/or other non-recoverable gases from the vapor recovery system. It should be noted that, in some embodiments, the optional vapor recovery system may be placed in other locations. Other products (e.g., excess gas) may be transported to optional compressor 100 via stream 76, where they may be compressed and used as fluidization gas in the reactor (stream 102) and/or where they may assist in transporting the hydrocarbonaceous material to the reactor.

In some embodiments, the liquid fraction is further processed to separate the water phase from the organic phase in separator 60 in FIG. 1. Aqueous phase 62 obtained from liquids separator 60 may be sent to waste water cleanup or the organic components present in 62 may be further concentrated in separator 80, for example by membrane separation or distillation or osmotic separation or other methods known to those skilled in the art, to obtain a more concentrated stream 84 and a less concentrated stream 82. Stream 84 that is more concentrated in hydrocarbonaceous materials may be recycled back to reactor 20 for further upgrading to useful and valuable products via catalytic fast pyrolysis.

Organic phase 64 may optionally be fed to a product separator 90. Product separation in 90 can separate the organic materials into a crude product 92 that is enriched in the desired components for transport to further purification or processing, and a crude material 94 that is relatively depleted of useful materials. Stream 94 can be recycled back to reactor 20 for further upgrading via catalytic fast pyrolysis to produce additional useful products or it can be used as fuel or otherwise disposed of.

As shown in FIG. 1 streams 84 and 94 may be combined or may be separately fed to reactor 20. Streams 84 and 94 may be combined to be added to the biomass feed or either 84 or 94 may be separately mixed with the biomass for introduction into reactor 20.

It should be understood that, while the set of embodiments described by FIG. 1 includes a reactor, solids separator, regenerator, condenser, etc., not all embodiments will involve the use of these elements. For example, in some embodiments, the feed stream may be fed to a catalytic fixed bed reactor, reacted, and the reaction products may be collected directly from the reactor and cooled without the use of a dedicated condenser. In some instances the product may be fed to a quench tower to which is fed a cooling fluid, preferably a liquid, along with the product stream to cool and condense the products. In some instances, while a dryer, grinding system, solids separator, regenerator, condenser, and/or compressor may be used as part of the process, one or more of these elements may comprise separate units not fluidically and/or integrally connected to the reactor. In other embodiments, one or more of the dryer, grinding system, solids separator, regenerator, condenser, and/or compressor may be absent. In some embodiments, the desired reaction product(s) (e.g., liquid aromatic hydrocarbons, olefin hydrocarbons, gaseous products, etc.) may be recovered at any point in the production process (e.g., after passage through the reactor, after separation, after condensation, etc.).

GLOSSARY

Aromatics

As used herein, the terms "aromatics" or "aromatic compound" are used to refer to a hydrocarbon compound or compounds comprising one or more aromatic groups such as, for example, single aromatic ring systems (e.g., benzyl, phenyl, etc.) and fused polycyclic aromatic ring systems (e.g. naphthyl, 1,2,3,4-tetrahydronaphthyl, etc.). Examples of aromatic compounds include, but are not limited to, benzene, toluene, indane, indene, 2-ethyl toluene, 3-ethyl toluene, 4-ethyl toluene, trimethyl benzene (e.g., 1,3,5-trimethyl benzene, 1,2,4-trimethyl benzene, 1,2,3-trimethyl benzene, etc.), ethylbenzene, styrene, cumene, methylbenzene, propylbenzene, xylenes (e.g., p-xylene, m-xylene, o-xylene, etc.), naphthalene, methyl-naphthalene (e.g., 1-methyl naphthalene, anthracene, 9,10-dimethylanthracene, pyrene, phenanthrene, dimethyl-naphthalene (e.g., 1,5-dimethylnaphthalene, 1,6-dimethylnaphthalene, 2,5-dimethylnaphthalene, etc.), ethyl-naphthalene, hydrindene, methyl-hydrindene, and dymethyl-hydrindene. Single-ring and/or higher ring aromatics may also be produced in some embodiments.

Biomass

As used herein, the term "biomass" is given its conventional meaning in the art and is used to refer to any organic source of energy or chemicals that is renewable. Its 10 major components can be: (1) trees (wood) and all other vegetation; (2) agricultural products and wastes (corn, fruit, garbage ensilage, etc.); (3) algae and other marine plants; (4) metabolic wastes (manure, sewage), and (5) cellulosic urban waste. Examples of biomass materials are described, for example, in Huber, G. W. et al, "Synthesis of Transportation Fuels from Biomass: Chemistry, Catalysts, and Engineering," Chem. Rev. 106, (2006), pp. 4044-4098.

Biomass is conventionally defined as the living and recently dead biological material that can be converted for use as fuel or for industrial production. The criterion as biomass is that the material should be recently participating in the carbon cycle so that the release of carbon in the combustion process results in no net increase averaged over a reasonably short period of time (for this reason, fossil fuels such as peat, lignite and coal are not considered biomass by this definition as they contain carbon that has not participated in the carbon cycle for a long time so that their combustion results in a net increase in atmospheric carbon dioxide). Most commonly, biomass refers to plant matter grown for use as biofuel, but it also includes plant or animal matter used for production of fibers, chemicals or heat. Biomass may also include biodegradable wastes or byproducts that can be burnt as fuel or converted to chemicals, including municipal wastes, green waste (the biodegradable waste comprised of garden or park waste, such as grass or flower cuttings and hedge trimmings), byproducts of farming including animal manures, food processing wastes, sewage sludge, black liquor from wood pulp or algae. Biomass excludes organic material which has been transformed by geological processes into substances such as coal, oil shale or petroleum. Biomass is widely and typically grown from plants, including miscanthus, spurge, sunflower, switchgrass, hemp, corn (maize), poplar, willow, sugarcane, and oil palm (palm oil) with the roots, stems, leaves, seed husks and fruits all being potentially useful. The particular plant or other biomass source used is not important to the product chemical or fuel although the processing of the raw material for introduction to the processing unit will vary according to the needs of the unit and the form of the biomass.

Biomass Feed Particle Sizes

The hydrocarbonaceous material in the feed composition may comprise a solid, liquid, and/or gas. In cases where the hydrocarbonaceous material includes solids, the solids may be of any suitable size. In some cases, it may be advantageous to use hydrocarbonaceous solids with relatively small particle sizes. Small-particle solids may, in some instances, react more quickly than larger solids due to their relatively higher surface area-to-volume ratios compared to larger solids. In addition, small particle sizes may allow for more efficient heat transfer within each particle and/or within the reactor volume. This may prevent or reduce the formation of undesired reaction products. Moreover, small particle sizes may provide for increased solid-gas and solid-solid contact, leading to improved heat and mass transfer.

Biomass Pyrolysis Liquid

Biomass pyrolysis liquid or bio-oil is the liquid fraction that can be isolated from a pyrolysis reaction of biomass. Biomass pyrolysis liquid is usually dark brown and approximates to biomass in elemental composition. It is composed of a very complex mixture of oxygenated hydrocarbons with an appreciable proportion of water from both the original moisture and reaction product. Compositionally, the biomass pyrolysis oil will vary with the type of biomass, but is known to consist of oxygenated low molecular weight alcohols (e.g., furfuryl alcohol), aldehydes (aromatic aldehydes), ketones (furanone), phenols (methoxy phenols) and water. Solid char may also be present, suspended in the oil. The liquid is formed by rapidly quenching the intermediate products of flash pyrolysis of hemicellulose, cellulose and lignin in the biomass. Chemically, the oil contains several hundred different chemicals in widely varying proportions, ranging from formaldehyde and acetic acid to complex, high molecular weight phenols, anhydrosugars and other oligosaccharides. It has a distinctive odor from low molecular weight aldehydes and acids, is usually acidic with a pH of 1.5-3.8, and can be an irritant.

Catalyst Residence Time

The catalyst residence time of the catalyst in the reactor is defined as the volume of the reactor filled with catalyst divided by the volumetric flow rate of the catalyst through the reactor. For example, if a 3-liter reactor contains 2 liters of catalyst and a flow of 0.4 liters per minute of catalyst is fed through the reactor, i.e., both fed and removed, the catalyst residence time is 2/0.4 minutes, or 5 minutes.

Contact Time

Contact time is the residence time of a material in a reactor or other device, when measured or calculated under standard conditions of temperature and pressure, i.e., 0° C. and 1 atm. For example, a 2-liter reactor to which is fed 3 standard liters per minute of gas has a contact time of 2/3 minute, or 40 seconds for that gas. For a chemical reaction, contact time or residence time is based on the volume of the reactor, where substantial reaction is occurring, and would exclude volume where substantially no reaction is occurring, such as an inlet or an exhaust conduit. For catalyzed reactions, the volume of a reaction chamber is the volume where catalyst is present.

Conversion

The term "conversion of a reactant" refers to the reactant mole or mass change between a material flowing into a reactor and a material flowing out of the reactor divided by the moles or mass of reactant in the material flowing into the reactor. For example, if 100 grams of ethylene are fed to a reactor and 30 grams of ethylene are flowing out of the reactor, the conversion is [(100-30)/100]=70% conversion of ethylene.

Fluid

The term "fluid" refers to a gas, a liquid, a mixture of a gas and a liquid, or a gas or a liquid containing dispersed solids, liquid droplets and/or gaseous bubbles. The terms "gas" and "vapor" have the same meaning and are sometimes used interchangeably. In some embodiments, it may be advantageous to control the residence time of the fluidization fluid in the reactor. The fluidization residence time of the fluidization fluid is defined as the volume of the reactor divided by the volumetric flow rate of the fluidization fluid under process conditions of temperature and pressure.

Fluidized Bed Reactor

As used herein, the term "fluidized bed reactor" is given its conventional meaning in the art and is used to refer to reactors comprising a vessel that can contain a granular solid material (e.g., silica particles, catalyst particles, etc.), in which a fluid (e.g., a gas or a liquid) is passed through the granular solid material at velocities sufficiently high as to suspend the solid material and cause it to behave as though it were a fluid. Examples of fluidized bed reactors are described in Kirk-Othmer Encyclopedia of Chemical Technology (online), Vol. 11, Hoboken, N.J.: Wiley-Interscience, 2001, pages 791-825, incorporated herein by reference. The term "circulating fluidized bed reactor" is also given its conventional meaning in the art and is used to refer to fluidized bed reactors in which the granular solid material is passed out of the reactor, circulated through a line in fluid communication with the reactor, and recycled back into the reactor. Examples of circulating fluidized bed reactors are described in Kirk-Othmer Encyclopedia of Chemical Technology (Online), Vol. 11, Hoboken, N.J.: Wiley-Interscience, 2001, pages 791-825.

Bubbling fluidized bed reactors and turbulent fluidized bed reactors are also known to those skilled in the art. In bubbling fluidized bed reactors, the fluid stream used to fluidize the granular solid material is operated at a sufficiently low flow rate such that bubbles and voids are observed within the volume of the fluidized bed during operation. In turbulent fluidized bed reactors, the flow rate of the fluidizing stream is higher than that employed in a bubbling fluidized bed reactor, and hence, bubbles and voids are not observed within the volume of the fluidized bed during operation.

Examples of bubbling and turbulent fluidized bed reactors are described in Kirk-Othmer Encyclopedia of Chemical Technology (online), Vol. 11, Hoboken, N.J.: Wiley-Interscience, c2001-, pages 791-825, incorporated herein by reference.

Olefins

As used herein, the terms "olefin" or "olefin compound" (a.k.a. "alkenes") are given their ordinary meaning in the art, and are used to refer to any unsaturated hydrocarbon containing one or more pairs of carbon atoms linked by a double bond. Olefins include both cyclic and acyclic (aliphatic) olefins, in which the double bond is located between carbon atoms forming part of a cyclic (closed-ring) or of an open-chain grouping, respectively. In addition, olefins may include any suitable number of double bonds (e.g., monoolefins, diolefins, triolefins, etc.). Examples of olefin compounds include, but are not limited to, ethene, propene, allene (propadiene), 1-butene, 2-butene, isobutene (2 methyl propene), butadiene, and isoprene, among others. Examples of cyclic olefins include cyclopentene, cyclohexane, cycloheptene, among others. Aromatic compounds such as toluene are not considered olefins; however, olefins that include aromatic moieties are considered olefins, for example, benzyl acrylate or styrene.

Pore Size

Pore size relates to the size of a molecule or atom that can penetrate into the pores of a material. As used herein, the term "pore size" for zeolites and similar catalyst compositions refers to the Norman radii adjusted pore size well known to those skilled in the art. Determination of Norman radii adjusted pore size is described, for example, in Cook, M.; Conner, W. C., "How big are the pores of zeolites?" Proceedings of the International Zeolite Conference, 12th, Baltimore, Jul. 5-10, 1998; (1999), 1, pp 409-414, which is incorporated herein by reference in its entirety. As a specific exemplary calculation, the atomic radii for ZSM-5 pores are about 5.5-5.6 Angstroms, as measured by x-ray diffraction. In order to adjust for the repulsive effects between the oxygen atoms in the catalyst, Cook and Conner have shown that the Norman adjusted radii are 0.7 Angstroms larger than the atomic radii (about 6.2-6.3 Angstroms).

One of ordinary skill in the art will understand how to determine the pore size (e.g., minimum pore size, average of minimum pore sizes) in a catalyst. For example, x-ray diffraction (XRD) can be used to determine atomic coordinates. XRD techniques for the determination of pore size are described, for example, in Pecharsky, V. K. et at, "Fundamentals of Powder Diffraction and Structural Characterization of Materials," Springer Science+Business Media, Inc., New York, 2005, incorporated herein by reference in its entirety. Other techniques that may be useful in determining pore sizes (e.g., zeolite pore sizes) include, for example, helium pycnometry or low-pressure argon adsorption techniques. These and other techniques are described in Magee, J. S. et at, "Fluid Catalytic Cracking: Science and Technology," Elsevier Publishing Company, Jul. 1, 1993, pp. 185-195, which is incorporated herein by reference in its entirety. Pore sizes of mesoporous catalysts may be determined using, for example, nitrogen adsorption techniques, as described in Gregg, S. J. at al, "Adsorption, Surface Area and Porosity," 2nd Ed., Academic Press Inc., New York, 1982 and Rouquerol, F. et al, "Adsorption by powders and porous materials. Principles, Methodology and Applications," Academic Press Inc., New York, 1998, both incorporated herein by reference in their entirety.

In some embodiments, a screening method is used to select catalysts with appropriate pore sizes for the conversion of specific pyrolysis product molecules. The screening method may comprise determining the size of pyrolysis product molecules desired to be catalytically reacted (e.g., the molecule kinetic diameters of the pyrolysis product molecules). One of ordinary skill in the art can calculate, for example, the kinetic diameter of a given molecule. The type of catalyst may then be chosen such that the pores of the catalyst (e.g., Norman adjusted minimum radii) are sufficiently large to allow the pyrolysis product molecules to diffuse into and/or react with the catalyst. In some embodiments, the catalysts are chosen such that their pore sizes are sufficiently small to prevent entry and/or reaction of pyrolysis products whose reaction would be undesirable.

Catalysts

Catalyst components useful in the context of this invention can be selected from any catalyst known in the art, or as would be understood by those skilled in the art. Catalysts promote and/or effect reactions. Thus, as used herein, catalysts lower the activation energy (increase the rate) of a chemical process, and/or improve the distribution of products or intermediates in a chemical reaction (for example, a shape selective catalyst). Examples of reactions that can be catalyzed include: dehydration, dehydrogenation, isomerization, hydrogen transfer, aromatization, decarbonylation, decarboxylation, aldol condensation, and combinations thereof. Catalyst components can be considered acidic, neutral or basic, as would be understood by those skilled in the art.

For fast catalytic pyrolysis, particularly advantageous catalysts include those containing internal porosity selected according to pore size (e.g., mesoporous and pore sizes typically associated with zeolites), e.g., average pore sizes of less than about 100 Angstroms, less than about 50 Angstroms, less than about 20 Angstroms, less than about 10 Angstroms, less than about 5 Angstroms, or smaller. In some embodiments, catalysts with average pore sizes of from about 5 Angstroms to about 100 Angstroms may be used. In some embodiments, catalysts with average pore sizes of between about 5.5 Angstroms and about 6.5 Angstroms, or between about 5.9 Angstroms and about 6.3 Angstroms may be used. In some cases, catalysts with average pore sizes of between about 7 Angstroms and about 8 Angstroms, or between about 7.2 Angstroms and about 7.8 Angstroms may be used.

In some preferred embodiments of FCP, the catalyst may be selected from naturally occurring zeolites, synthetic zeolites and combinations thereof. In certain embodiments, the catalyst may be a ZSM-5 zeolite catalyst, as would be understood by those skilled in the art. Optionally, such a catalyst can comprise acidic sites. Other types of zeolite catalysts include: ferrierite, zeolite Y, zeolite beta, modernite, MCM-22, ZSM-23, ZSM-57, SUZ-4, EU-1, ZSM-11, (S)A1P0-31, SSZ-23, among others. In other embodiments, non-zeolite catalysts may be used; for example, $WOx/ZrO_2$, aluminum phosphates, etc. In some embodiments, the catalyst may comprise a metal and/or a metal oxide. Suitable metals and/or oxides include, for example, nickel, palladium, platinum, titanium, vanadium, chromium, manganese, iron, cobalt, zinc, copper, gallium, and/or any of their oxides, among others. In some cases promoter elements chosen from among the rare earth elements, i.e., elements 57-71, cerium, zirconium or their oxides for combinations of these may be included to modify activity or structure of the catalyst. In addition, in some cases, properties of the catalysts (e.g., pore structure, type and/or number of acid sites, etc.) may be chosen to selectively produce a desired product.

Catalysts for other processes, such as alkylation of olefins are well-known and can be selected for the treatment processes described herein.

Pyrolysis

As used herein, the terms "pyrolysis" and "pyrolyzing" are given their conventional meaning in the art and are used to refer to the transformation of a compound, e.g., a solid hydrocarbonaceous material, into one or more other substances, e.g., volatile organic compounds, gases and coke, by heat, preferably without the addition of, or in the absence of, $O_2$. Preferably, the volume fraction of $O2$ present in a pyrolysis reaction chamber is 0.5% or less. Pyrolysis may take place with or without the use of a catalyst. "Catalytic pyrolysis" refers to pyrolysis performed in the presence of a catalyst, and may involve steps as described in more detail below. Example of catalytic pyrolysis processes are outlined, for example, in Huber, G. W. et al, "Synthesis of Transportation Fuels from Biomass: Chemistry, Catalysts, and Engineering," Chem. Rev. 106, (2006), pp. 4044-4098.

Residence Time.

In some instances, it is beneficial to control the residence time of the reactants (e.g., the solid hydrocarbonaceous material and/or a non-solid reactant) and catalyst(s) in a reactor and/or under a defined set of reaction conditions (i.e. conditions under which the reactants can undergo pyrolysis or catalysis in a given reactor system).

An overall residence time is defined as the volume of the reactor or device, or specific portion of a device, divided by the exit flow of all gases out of the reactor, or device including fluidization gas, products, and impurities, measured or calculated at the average temperature of the reactor or device and the exit pressure of the reactor or device.

A reactant residence time of a reactant in the reactor is defined as the amount of time the reactant spends in the reactor. As is conventional, residence time is based on the feed rate of reactant and is independent of rate of reaction. The reactant residence time of the reactants in a reactor may be calculated using different methods depending upon the type of reactor being used. For gaseous reactants, where flow rate into the reactor is known, this is typically a simple calculation. In the case of solid reactants in which the reactor comprises a packed bed reactor into which only reactants are continuously fed (i.e. no carrier or fluidizing flow is utilized), the reactant residence time in the reactor may be calculated by dividing the volume of the reactor by the volumetric flow rate of the hydrocarbonaceous material and fluid hydrocarbon product exiting the reactor.

In cases where the reaction takes place in a reactor that is closed to the flow of mass during operation (e.g., a batch reactor), the batch residence time of the reactants in such a reactor is defined as the amount of time elapsing between the time at which the temperature in the reactor containing the reactants reaches a level sufficient to commence a pyrolysis reaction (e.g., for FCP, typically about 300° C. to about 1000° C. for many typical hydrocarbonaceous feedstock materials) and the time at which the reactor is quenched (e.g., cooled to a temperature below that sufficient to support further pyrolysis—e.g. typically about 300° C. to about 1000° C. for many typical hydrocarbonaceous feedstock materials).

In some cases, e.g. for certain fluidized bed reactors, the reactor feed stream(s) may include feed stream(s) comprising auxiliary materials (i.e., matter other than solid hydrocarbonaceous materials and/or non-solid reactants). For example, in certain cases where fluidized beds are used as reactors, the feed stream may comprise fluidization fluid(s). In cases where circulating fluidized beds are used, catalyst and the fluidization fluid may both be fed, recycled, or fed and recycled to the reactor. In such cases, the reactant residence time of the reactants in the reactor can be determined as the volume of the reactor divided by the volumetric flow rate of the reactants and reaction product gases exiting the reactor as with the packed bed situation described above; however, since the flow rates of the reactants and reaction product gases exiting the reactor may not be convenient to determine directly, the volumetric flow rate of the reactants and reaction product gases exiting the reactor may be estimated by subtracting the feed volumetric flow rate of the auxiliary materials into the reactor (e.g., fluidization fluid, catalyst, contaminants, etc.) into the reactor from the total volumetric flow rate of the gas stream(s) exiting the reactor.

Selectivity

The term "selectivity" refers to the amount of production of a particular product in comparison to a selection of products. Selectivity to a product may be calculated by dividing the amount of the particular product by the amount of a number of products produced. For example, if 75 grams of aromatics are produced in a reaction and 20 grams of benzene are found in these aromatics, the selectivity to benzene amongst aromatic products is 20/75=26.7%. Selectivity can be calculated on a mass basis, as in the aforementioned example, or it can be calculated on a carbon basis, where the selectivity is calculated by dividing the amount of carbon that is found in a particular product by the amount of carbon that is found in a selection of products. Unless specified otherwise, for reactions involving biomass as a reactant, selectivity is on a mass basis. For reactions involving conversion of a specific molecular reactant (ethene, for example), selectivity is the percentage (on a mass basis unless specified otherwise) of a selected product divided by all the products produced.

Yield

The term yield is used herein to refer to the amount of a product flowing out of a reactor divided by the amount of reactant flowing into the reactor, usually expressed as a percentage or fraction. Yields are often calculated on a mass basis, carbon basis, or on the basis of a particular feed component. Mass yield is the mass of a particular product divided by the weight of feed used to prepare that product. For example, if 500 grams of biomass is fed to a reactor and 45 grams of benzene is produced, the mass yield of benzene would be 45/500=9% benzene. Carbon yield is the mass of carbon found in a particular product divided by the mass of carbon in the feed to the reactor. For example, if 500 grams of biomass that contains 40% carbon is reacted to produce 45 grams of benzene that contains 92.3% carbon, the carbon yield is [(45*0.923)/(500*0.40)]=20.8%. Carbon yield from biomass is the mass of carbon found in a particular product divided by the mass of carbon fed to the reactor in a particular feed component. For example, if 500 grams of biomass containing 40% carbon and 100 grams of $CO_2$ are reacted to produce 40 g of benzene (containing 92.3% carbon), the carbon yield on biomass is [(40*0.923)/(500*0.40)]=18.5%; note that the mass of $CO_2$ does not enter into the calculation.

As is standard patent terminology, the term "comprising" means "including" and does not exclude additional components. Any of the inventive aspects described in conjunction with the term "comprising" also include narrower embodiments in which the term "comprising" is replaced by the narrower terms "consisting essentially of" or "consisting of:" As used in this specification, the terms "includes" or "including" should not be read as limiting the invention but, rather, listing exemplary components.

DESCRIPTION OF SOME PREFERRED EMBODIMENTS

In this invention, a liquid that is recovered from a pyrolysis reaction, preferably pyrolysis of biomass, is, optionally, subjected to a treatment or treatments, and the liquid phase or a product from the liquid phase is returned to a pyrolysis reactor. Typically, the liquid phase or product is returned to the same pyrolysis reactor from which the liquid phase was condensed; however, in any of the embodiments herein, it is contemplated that multiple reactors could be used in combination and the liquid phase or product could be transferred to a different pyrolysis reactor and/or to multiple reactors.

Condensation of condensable materials from the pyrolysis products occurs by passing them through a condensation train to condense and collect the desired products as liquid phases. Typically, the condensation train will comprise one or more chilled water condensers, one or more electrostatic precipitator and one or more coalescence filter, as are well known in the art, all of which will be connected in series. While the order of the condensers can be varied, it is typical that the first condenser is a water cooled condenser with temperatures on the water side of 15 to 35° C. Additional condensers can be used that are chilled to lower temperatures, for example, from −10 C to 15° C. Condensation can also be effected by quenching the product mixture with a liquid quench stream, typically water or an organic phase such as a heavy organic, for example, the less valuable reaction products. All gases that pass through the condensation train may also be collected at the end of the train.

In most embodiments, two liquid phases are condensed from a pyrolysis reactor, an aqueous phase and an organic phase. The aqueous phase comprises a significant fraction of the condensed phases, for example, the condensed aqueous phase may comprise 20 to 80 mass % of the condensed phases, in some embodiments, 35 to 65 mass % of the condensed phases. The organic phase may (and typically does) comprise small amounts of dissolved water as well. The percent water in a liquid phase can be measured by known methods such as NMR (nuclear magnetic resonance), HPLC (high performance liquid chromatography), gas chromatography, or by fractional distillation. Preferably, the mass % water in an organic phase is determined by Karl Fisher titration.

In some embodiments, the aqueous liquid phase is treated such that one or more organic components are removed, and the resulting liquid, now enriched in water, is recycled to a pyrolysis reactor. More preferably, water is removed from the aqueous phase and a water-depleted stream is recycled to the pyrolysis reactor. In some preferred embodiments, the aqueous phase is treated to have at least 10 mass % less water, in some embodiments at least 30% less water, in some embodiments, at least 50% less water, and in some embodiments, 30 to 80% less water. Water can be removed from the aqueous phase by any suitable method including distillation, absorption, filtration, osmosis, membrane separation, or any other process.

In some embodiments the liquid organic phase is separated into a crude fraction enriched in useful products and a second fraction relatively depleted in useful products. Separations of organic liquids can be accomplished by distillation, adsorption, membrane separation, osmosis or any other process. The fraction that is relatively depleted in useful products can be optionally recycled to the pyrolysis reactor.

The distillation of either the water or organic phases is accomplished by conventional methods using conventional distillation equipment such as tray, bubble cap, packed columns or the like. Distillation may be carried out at subatmospheric pressures or at atmospheric pressures. Ordinarily, this distillation will be carried out at subatmospheric pressures with pressures of 1 to 75 kPa being preferred. It is, of course, understood that where separations of the carbonaceous product or the recycle stream are made to narrow the recycle stream by excluding water, the above preferred pressures may be somewhat less preferred. The method of distillation, as well as pressures and other conditions are not to be held limiting to the present invention since the choice of such methods to provide the desired splits in the catalytically pyrolyzed products are well within the ability of those skilled in the art. In some cases the heavier products will be recycled, in other cases the lighter products will be recycled. With these teachings, one skilled in the art will find little difficulty in providing the equipment and conditions for obtaining these recycle fractions by distillation.

Adsorption of the organics dissolved in or suspended in an aqueous phase can be accomplished by passing the aqueous phase through a bed of organic materials such as solid biomass, coked catalyst, char, or the like. The organics in the aqueous phase are preferentially adsorbed on the bed of organic materials and the water-enriched aqueous phase passes through. The organics-enriched biomass or other organics adsorbent can be fed back to the pyrolysis reactor.

Adsorption of the water dissolved in or suspended in an organic phase can be accomplished by contacting the organic phase with a bed of water adsorbent materials or passing the organic phase through a bed of water adsorbent materials such as silica gel, magnesium sulfate, clays, zeolites or the like at modest temperatures, ie less than 200° C., or less than 100° C., or less than 50° C., to remove the water. The organic-enriched phase passes through the adsorbent or remains above the adsorbent. The organic phase can be fed back to the pyrolysis reactor.

A filtration process can be used to separate suspended solids from an aqueous or organic phase before, after, or independent of any adsorption process to remove suspended solids or adsorbent materials. Filtration techniques are well known to those skilled in the art.

Membrane separation of the organic and aqueous materials in the aqueous or organic phases can be accomplished by contacting the liquid phase with a permselective membrane in a batch or continuous process. Continuous processing according to the invention is achievable wherein an aqueous solution feed stream containing organic components is passed on one side and in contact with a hydrophobic, polymeric membrane having selectivity for the organic components, while a solution sink or vapor vacuum is in contact with the permeate side of the membrane. The lower chemical potential of, for example, the organic component solution sink together with counter current relationship of the organic aqueous solution feed stream, provides driving force for permeating organics through these selective membranes into the organic solution sink. The organic enriched solution sink or vapor can be swept or moved by physical means to suitable processing which promotes the recycling of the organics and any complexing solutions. Suitable complexing solutions could be derived from organic fractions of the reaction product including aromatics, phenols, olefins or the like. The membrane permeation step is preferably operated under ambient conditions of temperature which can vary over a wide range from about −50° C. to about 250° C. depending upon the selection of the sweep liquid and the thermal condition of the feed mixture. Higher operating temperatures are frequently desirable because of the increased rates of permeation; however, the present invention is primarily concerned with minimum energy input or minimum temperature change for the purpose of separating water from aqueous mixtures or from organic phases.

The permeation membrane used in the inventive process is non-porous, that is, free from holes and tears and the like, which destroy the continuity of the membrane surface. Useful membranes according to the invention are comprised of organic, polymeric materials. The membranes are preferably in as thin a form as possible which permits sufficient strength and stability for use in the permeation process. Generally separation membranes from about 0.1 to about 15 mils or somewhat more are utilized. High rates of permeation are obtained with thinner membranes which can be supported with structures such as fine mesh wire, screen, porous metals, and ceramic materials. The membrane may be a simple disc or sheet of the membrane substance which is suitably mounted in a duct or pipe, or mounted in a plate and framed filter press. Other forms of membrane may also be employed such as hollow tubes and fibers through which or around which the feed is applied or is recirculated with the permeate being removed at the other side of the tube as a sweep liquid phase. Various other useful shapes and sizes readily adaptable to commercial installations are known to those skilled in the art.

In one set of embodiments, a method for producing one or more fluid hydrocarbon products from a solid hydrocarbonaceous material comprises providing a solid catalyst in a fluidized bed reactor; feeding a solid hydrocarbonaceous material to the fluidized bed reactor, pyrolyzing within the fluidized bed reactor at least a portion of the hydrocarbonaceous material under reaction conditions sufficient to produce one or more pyrolysis products; and catalytically reacting at least a portion of the one or more pyrolysis products using the solid catalyst under reaction conditions sufficient to produce the one or more fluid hydrocarbon products, at least partially condensing products from the product stream to produce organic and aqueous liquid phases, separating from the aqueous phase at least a portion of the hydrocarbonaceous material contained therein and recycling such hydrocarbonaceous material to the feed of the FCP reactor with the solid hydrocarbonaceous material. The condensed phase that is fed back to the FCP reactor could be in the form of a suspension and/or an emulsion and may contain additional organic or catalytic materials.

In another embodiment, gases collected from the product stream are at least partially separated and recycled to the FCP process along with the solid feed and recycled water soluble fraction.

A particularly advantageous method of separating and concentrating the water soluble organics is to filter the aqueous solution through a layer of biomass so that the organics are absorbed by the biomass. The organics-impregnated biomass can be further dried or otherwise treated and fed to the reactor for FCP upgrading. In this way the organics from the water soluble fraction are converted to valuable products, including aromatics (BTXN), olefins, CO, CO2, phenol and other valuable materials. After filtering through the biomass, the aqueous solution can be discarded or passed to a water treatment process.

Catalyst components useful in the context of this invention can be selected from any catalyst known in the art, or as would be understood by those skilled in the art. Functionally, catalysts may be limited only by the capability of any such material to promote and/or effect dehydration, dehydrogenation, isomerization, hydrogen transfer, aromatization, decarbonylation, decarboxylation, aldol condensation and/or any other reaction or process associated with or related to the pyrolysis of a hydrocarbonaceous material. Catalyst components can be considered acidic, neutral or basic, as would be understood by those skilled in the art.

The invention is generally applicable to any biomass pyrolysis reaction. Preferably, the biomass feedstock comprises a solid hydrocarbonaceous material. The biomass feedstock may comprise, for example, any one or combination of the biomass sources that are mentioned in the Glossary section. The pyrolysis reactor can be without a solid catalyst; however, preferably, the pyrolysis reactor comprises a solid catalyst for fast catalytic pyrolysis (FCP). The type of reactor and the type of solid catalyst (if present) are not limited, and can be generally of the type known for conversion of biomass to fluid hydrocarbonaceous streams. Examples of suitable apparatus and process conditions for FCP are described in the patent application of Huber at al. [US20090227823] that is incorporated herein by reference. Conditions for FCP of biomass can be selected from any one or any combination of the following features (which are not intended to limit the broader aspects of the invention): a zeolite catalyst, a ZSM-5 catalyst; a zeolite catalyst comprising one or more of the following metals: titanium, vanadium, chromium, manganese, iron, cobalt, nickel, copper, zinc, gallium, platinum, palladium, silver, phosphorus, sodium, potassium, magnesium, calcium, tungsten, zirconium, cerium, lanthanum, and combinations thereof; a fluidized bed, circulating bed, or riser reactor; an operating temperature in the range of 300° to 1000° C.; and/or a solid catalyst-to-biomass mass ratio of between 0.1 and 20.

What is claimed:

1. A method for producing one or more fluid hydrocarbon products from a hydrocarbonaceous material, comprising: feeding a hydrocarbonaceous material to a reactor, and pyrolyzing within the reactor, in the presence of a solid catalyst, at least a portion of the hydrocarbonaceous material under reaction conditions sufficient to produce one or more gaseous pyrolysis products, condensing the gaseous pyrolysis products to form a liquid phase condensed product, wherein the liquid phase condensed product comprises an aqueous phase and an organic phase;

removing at least a portion of the water from the aqueous phase to form a water-depleted stream and feeding a portion of the water-depleted stream back into the reactor.

2. The method of claim 1 wherein the step of removing at least a portion of the water comprises treating the aqueous phase to remove 30 to 80% of the water in the aqueous phase.

3. The method of claim 1 wherein the step of removing at least a portion of the water comprises treating the aqueous phase to remove at least 50% of the water to result in the water depleted stream.

4. The method of claim 1 wherein the catalyzed pyrolysis forms olefins and aromatics.

5. The method of claim 1 wherein the hydrocarbonaceous material that is fed to the reactor comprises a solid hydrocarbonaceous material in the presence of a gas phase.

6. The method of claim 1 wherein the hydrocarbonaceous material is at least 90 mass % solids.

7. The method of claim 1 wherein the hydrocarbonaceous material is only in a slurry phase.

8. The method of claim 1 wherein the step of feeding the water depleted stream back into the reactor comprises contacting the water depleted stream with the hydrocarbonaceous material before the hydrocarbonaceous material is fed to the reactor.

9. The method of claim 1 wherein the solid catalyst in the reactor is selected from the group consisting of: silicon, aluminum, titanium, vanadium, chromium, manganese, iron, cobalt, nickel, copper, zinc, gallium, platinum, palladium, silver, phosphorus, sodium, potassium, magnesium, calcium, tungsten, zirconium, cerium, lanthanum, and combinations thereof.

10. The method of claim 1 wherein the solid catalyst comprises a zeolite.

11. The method of claim 1 wherein the hydrocarbonaceous material and the catalyst are fed to the reactor and the mass ratio of the catalyst fed to the reactor to the hydrocarbonaceous material fed to the reactor is between 0.1 and 20.

12. The method of claim 1 wherein carbonaceous material is separated from the aqueous phase and at least a portion of the separated carbonaceous material is recycled to the reactor.

13. The method of claim 12 wherein the separated carbonaceous material comprises olefins, aromatics, or oxygenates, or a mixture of these, and at least a portion of these are fed to the reactor.

14. The method of claim 13 wherein a gas is bubbled through the aqueous phase to separate the carbonaceous material and the resulting gas phase, which is enriched with at least one component from the aqueous phase, is passed into the reactor.

15. The method of claim 1 wherein the reactor is a fluidized bed.

16. The method of claim 1 wherein the hydrocarbonaceous material fed to the reactor comprises: a biomass material; plastic waste, recycled plastics, agricultural and municipal solid waste, food waste, animal waste, carbohydrates, lignocellulosic materials, xylitol, glucose, cellobiose, hemi-cellulose, lignin, sugar cane bagasse, glucose, wood, or corn stover, or any combination of these materials.

17. The method of claim 1 wherein the catalyzed pyrolysis is conducted at a pressure (absolute) in the range of 0.1 to 10 atm.

* * * * *